United States Patent
Murakami

(10) Patent No.: US 10,428,721 B2
(45) Date of Patent: Oct. 1, 2019

(54) COOLING CONTROL DEVICE, FLOW RATE CONTROL VALVE AND COOLING CONTROL METHOD

(71) Applicant: HITACHI AUTOMOTIVE SYSTEMS, LTD., Hitachinaka-shi, Ibaraki (JP)

(72) Inventor: Shingo Murakami, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 481 days.

(21) Appl. No.: 15/301,510

(22) PCT Filed: Apr. 14, 2015

(86) PCT No.: PCT/JP2015/061404
§ 371 (c)(1),
(2) Date: Oct. 3, 2016

(87) PCT Pub. No.: WO2015/163181
PCT Pub. Date: Oct. 29, 2015

(65) Prior Publication Data
US 2017/0122181 A1 May 4, 2017

(30) Foreign Application Priority Data

Apr. 25, 2014 (JP) .................................. 2014-090809

(51) Int. Cl.
*F01P 7/16* (2006.01)
*F16K 11/22* (2006.01)
(Continued)

(52) U.S. Cl.
CPC ........ *F01P 7/16* (2013.01); *F01P 3/02* (2013.01); *F01P 3/18* (2013.01); *F01P 7/165* (2013.01);
(Continued)

(58) Field of Classification Search
CPC ........ F01P 7/16; F01P 3/02; F01P 3/18; F01P 2070/02; F01P 2003/024; F01P 2007/146
See application file for complete search history.

(56) References Cited

U.S. PATENT DOCUMENTS 6,371,060 B1   4/2002  Lehmann et al.
6,915,958 B2 * 7/2005  Colas ...................... F01P 7/167
                                                              236/34.5

(Continued)

FOREIGN PATENT DOCUMENTS

JP    01-253524 A    10/1989
JP    10-317967 A    12/1998
(Continued)

*Primary Examiner* — Hung Q Nguyen
(74) *Attorney, Agent, or Firm* — Foley & Lardner LLP

(57) ABSTRACT

In a cooling control device CM that controls the cooling state of an external device by controlling the flow rate of cooling water that flows in from an introduction port 10 and causing the cooling water to flow out from a first to a third discharge ports E1 to E3, the cooling control device CM is configured that, for example, the flow rate of the cooling water to be supplied to a radiator side from the cooling control device CM is controlled by the cooperation of a flow rate control valve CV that controls the flow rate of the water supply according to a preset rule, and a switching control valve SV that controls the flow rate of the water supply independently from the flow rate control valve CV through a route different from that of the flow rate control valve CV.

17 Claims, 13 Drawing Sheets

(51) Int. Cl.
    *F16K 31/53*         (2006.01)
    *F16K 11/085*      (2006.01)
    *F16K 31/00*         (2006.01)
    *F16K 31/04*         (2006.01)
    *F01P 3/02*          (2006.01)
    *F01P 3/18*          (2006.01)
    *G05D 23/19*        (2006.01)
    *F01P 7/14*          (2006.01)

(52) U.S. Cl.
    CPC .......... *F16K 11/0856* (2013.01); *F16K 11/22* (2013.01); *F16K 31/002* (2013.01); *F16K 31/041* (2013.01); *F16K 31/535* (2013.01); *G05D 23/19* (2013.01); *F01P 2003/024* (2013.01); *F01P 2007/146* (2013.01); *F01P 2070/02* (2013.01)

(56) References Cited

U.S. PATENT DOCUMENTS

| | | | |
|---|---|---|---|
| 7,726,266 B2 * | 6/2010 | Komurian | F01P 7/165 |
| | | | 123/41.08 |
| 2010/0212612 A1 | 8/2010 | Vacca et al. | |
| 2015/0122359 A1 * | 5/2015 | Tsuchiya | F01P 7/16 |
| | | | 137/625.47 |
| 2015/0267603 A1 | 9/2015 | Ichihara et al. | |

FOREIGN PATENT DOCUMENTS

| | | |
|---|---|---|
| JP | 2001-041039 A | 2/2001 |
| JP | 2010-528229 A | 8/2010 |
| JP | 2013-238138 A | 11/2013 |
| WO | WO-2013/172017 A1 | 11/2013 |

\* cited by examiner

US 10,428,721 B2

COOLING CONTROL DEVICE, FLOW RATE CONTROL VALVE AND COOLING CONTROL METHOD

TECHNICAL FIELD

The present invention relates to a cooling control device, a flow rate control valve and a cooling control method applied to, for example, engine cooling of a vehicle.

BACKGROUND ART

For example, as a related art cooling control device applied to the engine cooling of the vehicle, for example, a cooling control device disclosed in following Patent Document 1 has been known.

That is, when a cooling system is in a normal time, this cooling control device performs the circulation of cooling water by a first control valve that operates in a normal circulation mode, and when the cooling system is in an abnormal time when the temperature of the cooling water becomes high (allowable limit temperature) caused by, for example, a failure of the first control valve, by a second control valve that operates in a short circuit mode, the circulation of the cooling water becomes possible, and thereby the circulation of the cooling water is maintained when the cooling system is in the abnormal time.

PRIOR ART REFERENCE

Patent Document

Patent Document 1: Japanese Translation of PCT International Application Publication 2010-528229

SUMMARY OF THE INVENTION

Task to be Solved by the Invention

In this way, in the related art cooling control device, when the cooling system is in the normal time, only the first control valve operates and the second control valve becomes in a non-operation state. Consequently, the necessary and sufficient flow rate of the water supply of the first control valve in the normal time must be maintained, and, furthermore, the minimum flow rate of the water supply of the second control valve in the abnormal time must also be maintained. The overall size of the cooling control device therefore becomes large.

The present invention was made in consideration of such a technical problem. An object of the present invention is to provide a cooling control device which is capable of reducing the overall size of the cooling control device.

Means for Solving the Task

The present invention is a cooling control device that controls a cooling state of an external device by controlling a flow rate of a refrigerant that flows in from one of a first communication portion or a plurality of second communication portions and causing the refrigerant to flow out from the other of the first communication portion or the plurality of the second communication portions, the cooling control device having: a first control valve provided so as to connect the first communication portion with the plurality of second communication portions and controlling the flow rate of the refrigerant between the first communication portion and the plurality of the second communication portions according to a preset rule; and a second control valve provided so as to connect the first communication portion with a specific one of the plurality of the second communication portions through a rout different from that of the first control valve and controlling the flow rate of the refrigerant between both of the communication portions independently from the first control valve, wherein the flow rate of the refrigerant that flows through the first communication portion and the specific one of the plurality of the second communication portions is controlled by cooperation of the first control valve and the second control valve.

Effects of the Invention

According to the present invention, the flow rate of the refrigerant is controlled by the cooperation of the first control valve and the second control valve, and the size of the first control valve can be reduced by the flow rate of the water supply increased by the second control valve, while, by the second control valve, the flow rate of the water supply required when the first control valve is in the abnormal time is maintained, and therefore the overall size of the cooling control device is reduced.

BRIEF DESCRIPTION OF THE DRAWINGS

FIG. 8(*a*) shows a state in which only a second discharge port is in a communication state. FIG. 8(*b*) shows a state in which all discharge ports are in a non-communication state. FIG. 8(*c*) shows a state in which only a first discharge port is in the communication state. FIG. 8(*d*) shows a state in which the first and the second discharge ports are in the communication state. FIG. 8(*e*) shows a state in which all of the discharge ports are in the communication state.

MODE FOR IMPLEMENTING THE INVENTION

In the following, each embodiment of a cooling control device according to the present invention is explained based on the drawings. In addition, in each of the following embodiments, the cooling control device according to the present invention is explained with the cooling control device which is applied to a conventional circulation system of cooling water for a vehicle (hereinafter, simply called "cooling water") taken for example.

First Embodiment

Figure 1:
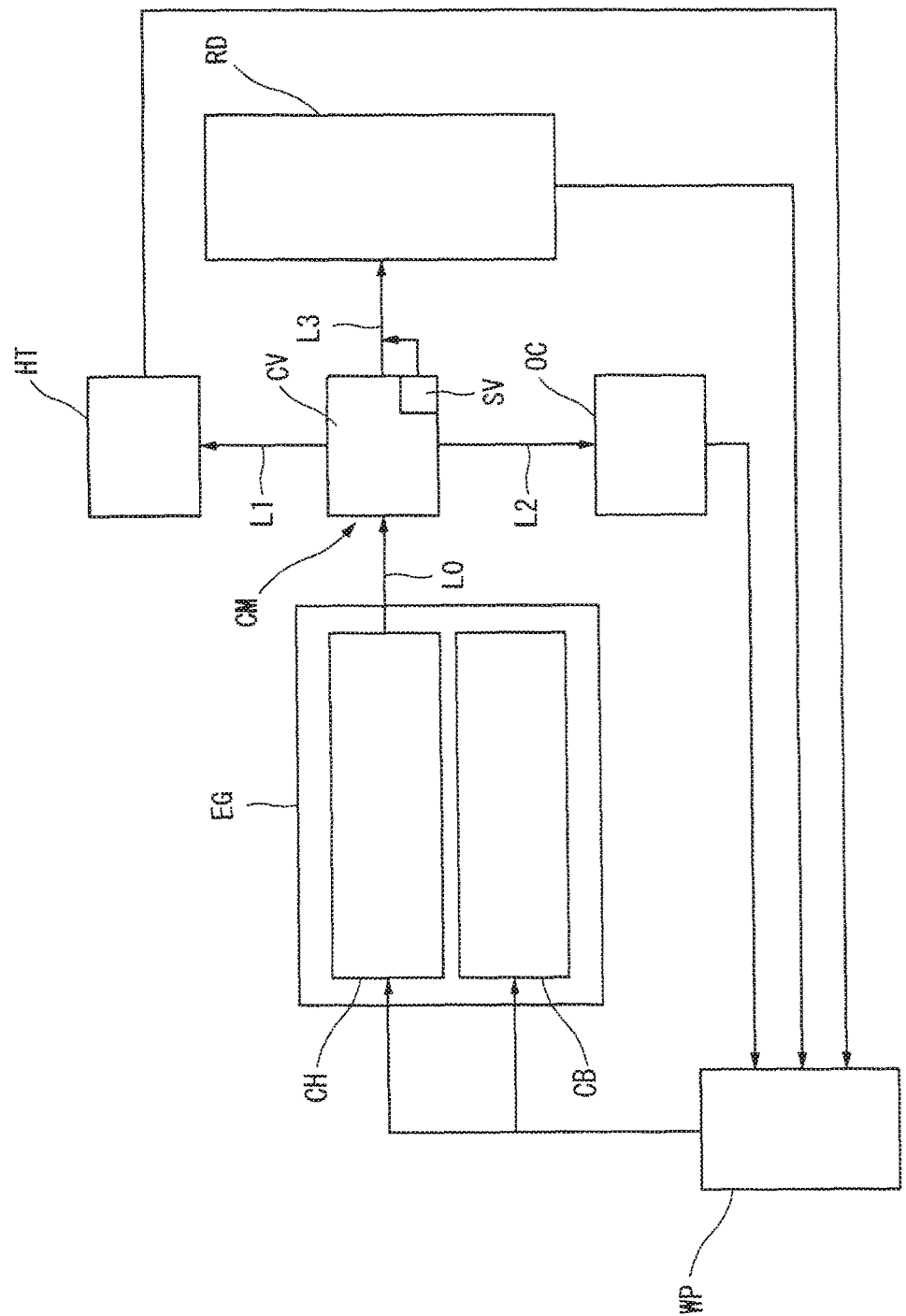
FIG. 1 is a schematic system diagram of a circulation system of cooling water for a vehicle, showing a first embodiment of a cooling control device according to the present invention.

FIG. 1 to FIG. 9 show a first embodiment of the cooling control device according to the present invention. As shown in FIG. 1, a cooling control device CM is one integrally formed by incorporating a switching control valve SV that is a second control valve into a flow control valve CV that is a first control valve as a main control valve. The cooling control device CM is provided at the side portion of a cylinder head HC of an engine EG. The cooling control device CM distributes cooling water introduced from the cylinder head CH side through an introduction passage L0 by being pressurized by a water pump WP to a heater heat exchanger HT, an oil cooler OC and a radiator RD respectively through a first to a third pipes L1 to L3, and controls each flow rate of the first to the third pipes L1 to L3, and thereby cooling the cooling water.

Figure 4:
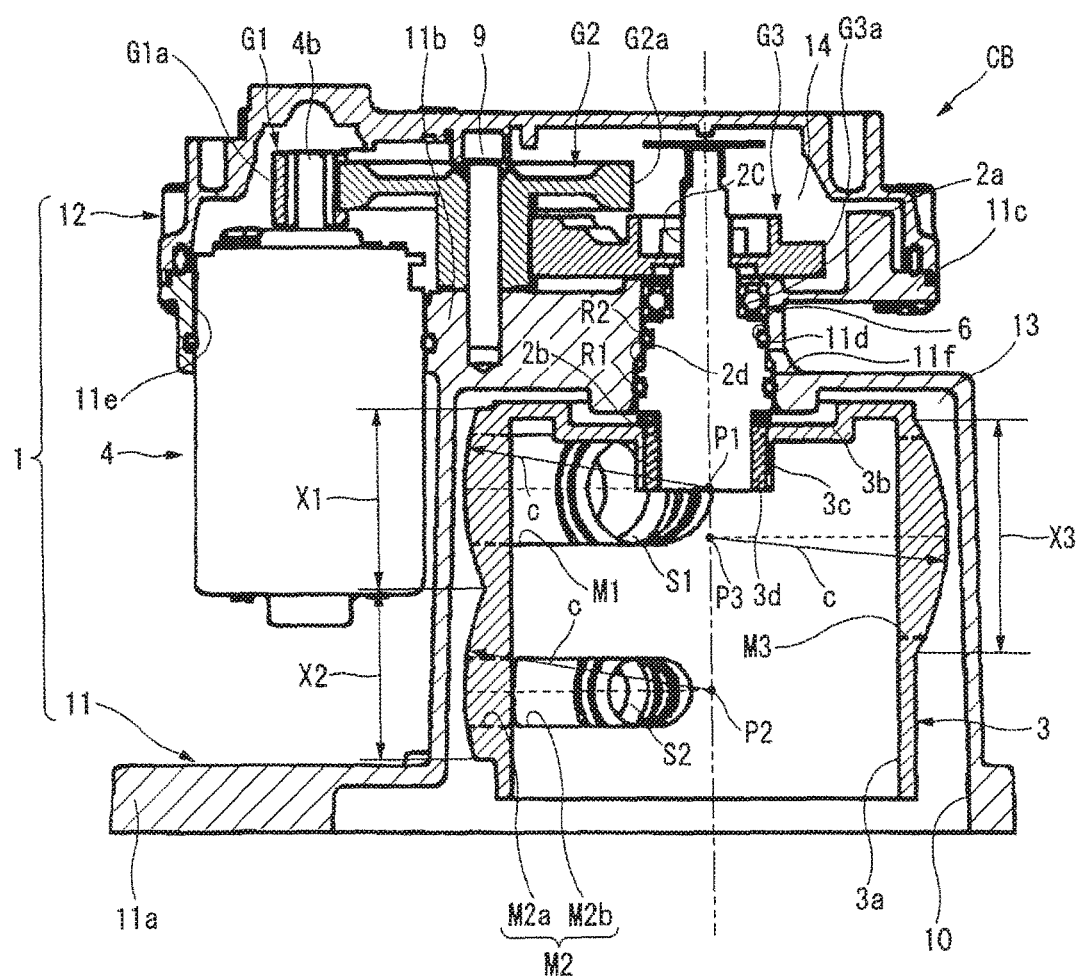
FIG. 4 is a sectional view taken along a line A-A of FIG. 3
Figure 5:
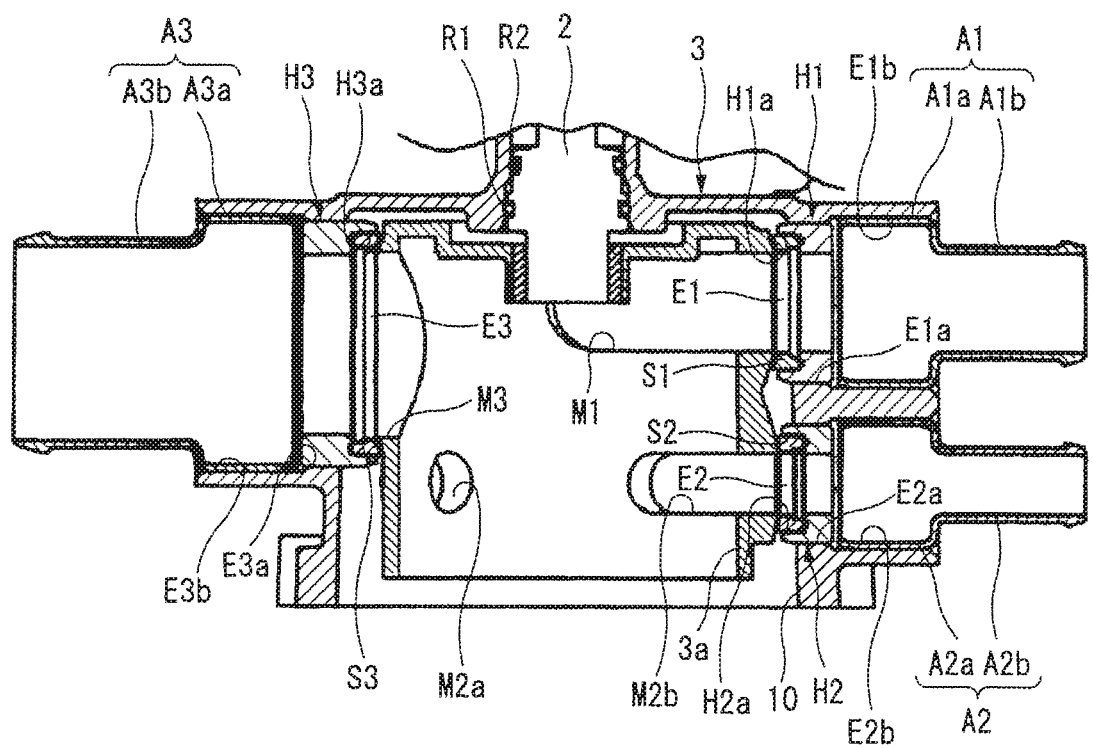
FIG. 5 is a sectional view taken along a line B-B of FIG. 3.
Figure 6:
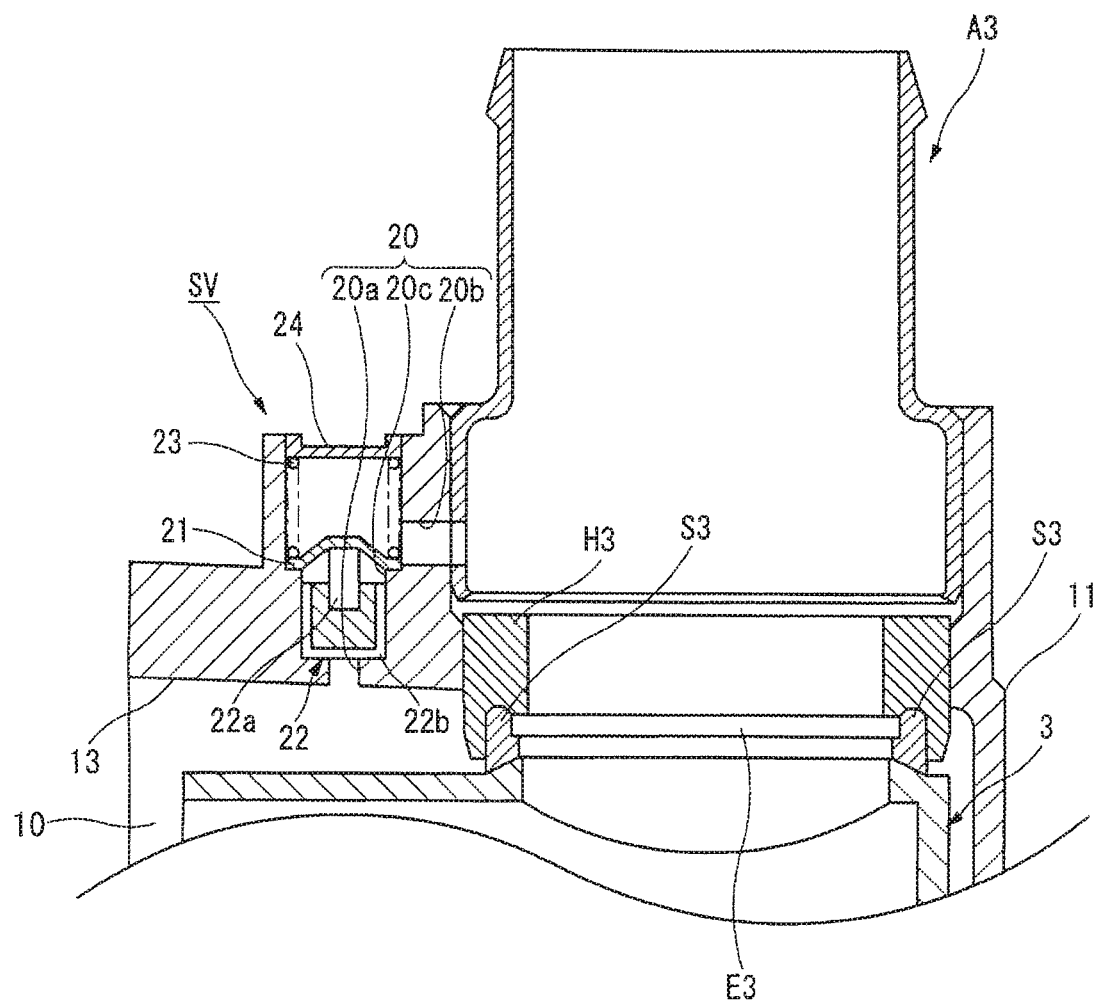
FIG. 6 is a longitudinal sectional view of a switching control valve shown in FIG. 2.

More specifically, in particular, as shown in FIG. 4 and FIG. 6, the cooling control device CM is mainly has an introduction port 10 as a first communication portion which is provided at one end part in the axial direction of a housing 1 formed into a substantially cylindrical shape and which introduces the cooling water from the cylinder head CH, a first to a third discharge ports E1 to E3 as a second communication portion which are provided on the outer peripheral portion of the other end side of the housing 1 and through which the cooling water introduced from the cylinder head CH flows to the first to the third pipes L1 to L3, a flow rate control valve CV which is provided on a main flow passage formed in the housing 1 and which controls the distribution and the flow rate of the whole cooling water, and a switching control valve SV which is provided on a flow passage (the after-mentioned communication passage 20) different from that of the flow rate control valve CV in the housing 1, and which controls the flow rate of the cooling water to the third pipe L3 by cooperating with the flow rate control valve CV.

Figure 2:
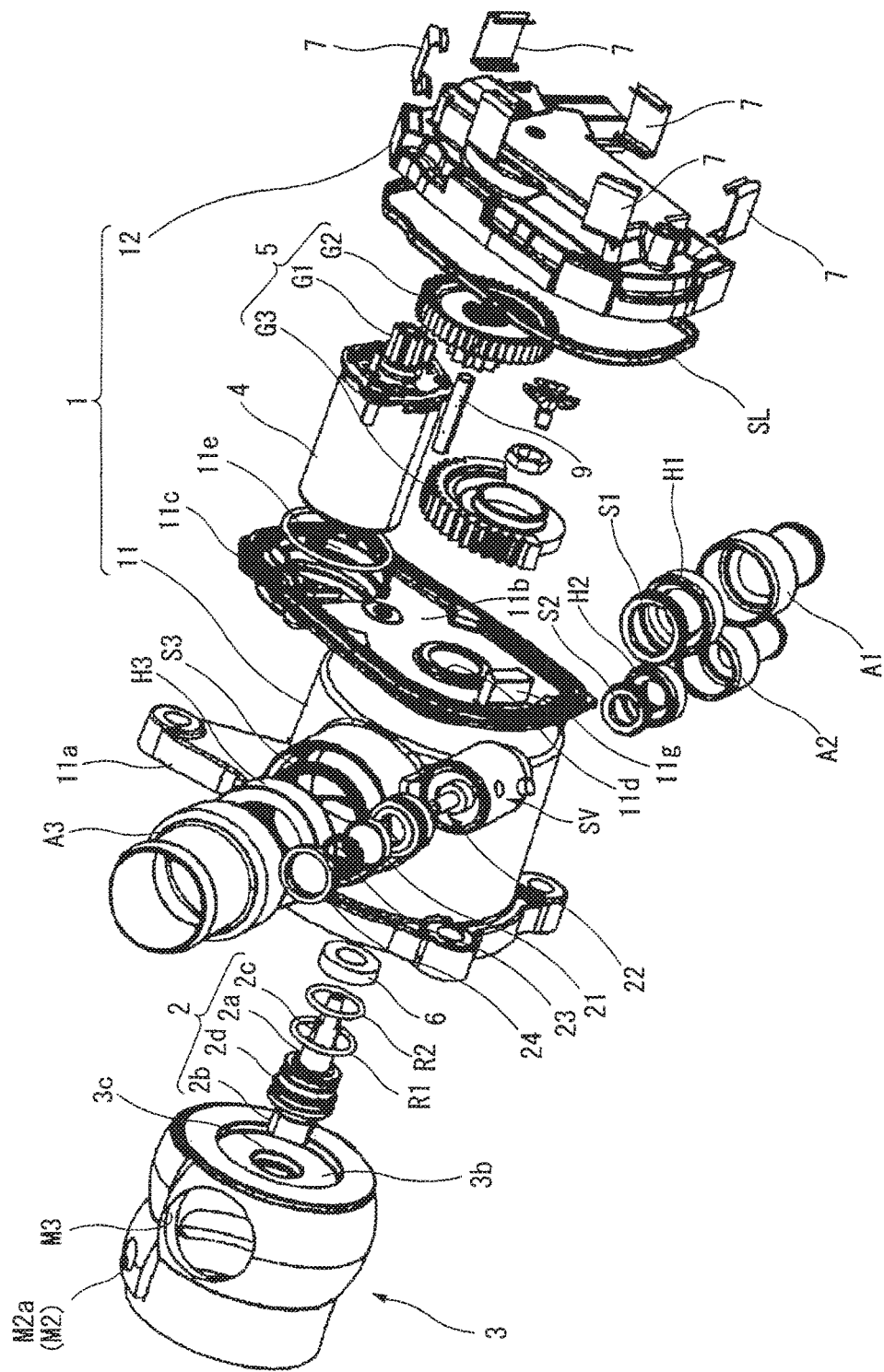
FIG. 2 is a perspective exploded view of the cooling control device shown in FIG. 1.
Figure 3:
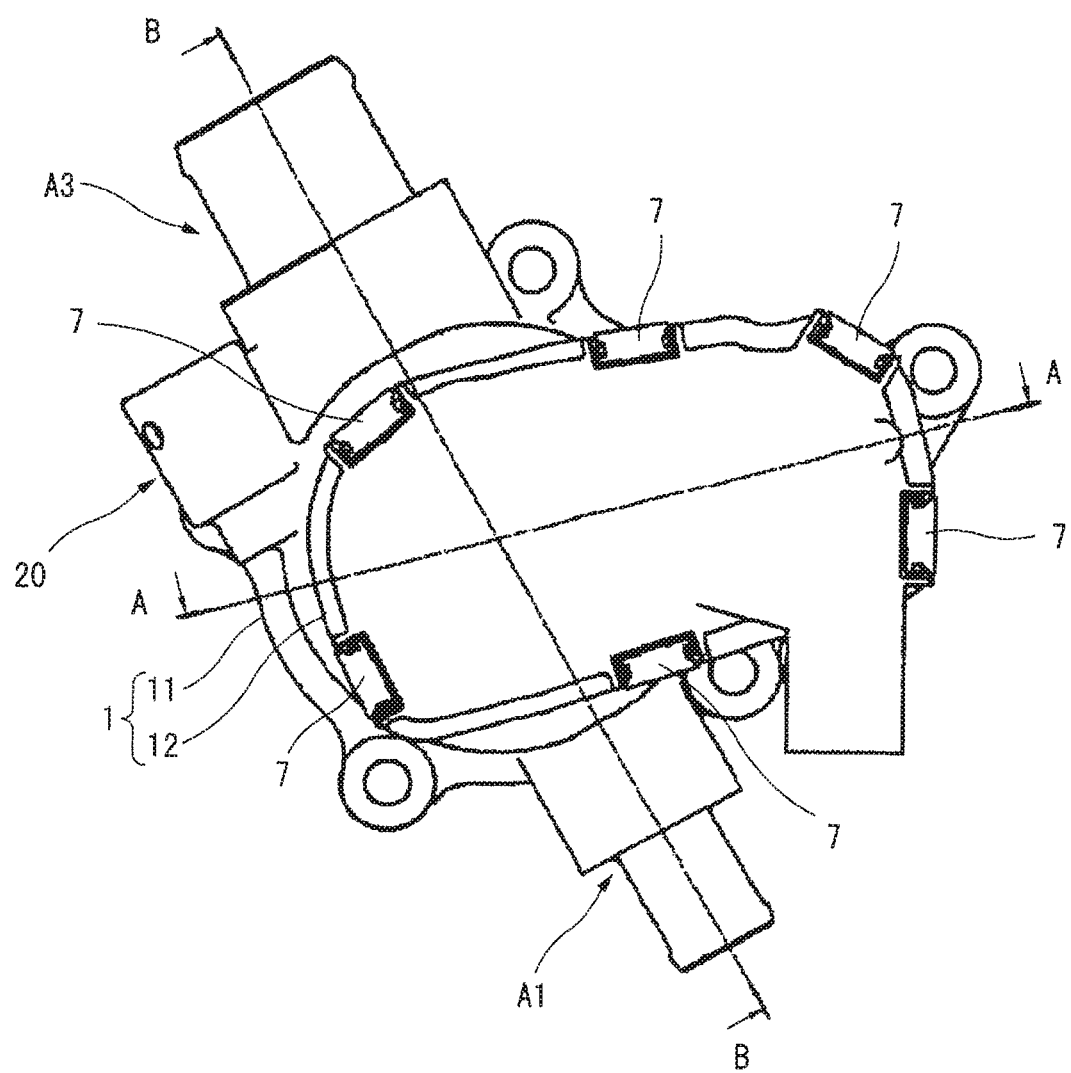
FIG. 3 is a front view of a flow rate control valve shown in FIG. 2.

As shown in FIG. 2 to FIG. 4, the flow rate control valve CV has a housing 1 in which a reduction gear mechanism accommodating portion 14 having an oval shape in cross section and extending in a width direction is formed at one end side that is an opposite side to where the cylinder head CH is attached and in which a substantially cylindrical valve body accommodating portion 13 is connected to the inside surface of the reduction gear mechanism accommodating portion 14 at one end side in the width direction of the reduction gear mechanism accommodating portion 14, a rotation shaft 2 which is inserted between the valve body accommodating portion 13 and the reduction gear mechanism accommodating portion 14 and which is rotatably supported by a bearing 6 provided between the positions 13 and 14, a substantially cylindrical valve body 3 which is fixed to one end part of the rotation shaft 2 so as to be able to integrally rotate with the rotation shaft 2 and which is rotatably accommodated in the valve body accommodating portion 13, an electric motor 4 to drive the valve body 3, electric motor 4 which is disposed parallel to the valve body accommodating portion 13 and which is fixed to the inside surface of the reduction gear mechanism accommodating portion 14 so that an output shaft 4b of the electric motor 4 faces the inside of the reduction gear mechanism accommodating portion 14 at the other end side in the width direction of the reduction gear mechanism accommodating portion 14, and a reduction gear mechanism 5 which is placed between the output shaft 4b of the electric motor 4 and the rotation shaft 2 and which reduces the rotation speed of the output shaft 4b of the electric motor 4 then transmits it to the rotation shaft 2. In the inside of the housing 1, the switching control valve SV which switches and controls the discharge of the cooling water introduced to the communication passage 20 is provided at the communication passage 20 provided adjacent to the after-mentioned discharge port E3 so as to bypass-communicate between the third discharge port E3 (a third adapter A3) and the valve body accommodating portion 13.

The housing 1 is a housing that is cast with an aluminum alloy material. The housing 1 has a first housing 11 which mainly forms the valve body accommodating portion 13 and a second housing 12 which mainly forms the reduction gear mechanism accommodating portion 14. Both of the housings 11 and 12 are held and fixed together by a plurality of square bracket-shaped clips 7 which are fitted to the outer peripheral edge portions of the housings 11 and 12.

The first housing 11 is provided, at one end thereof, with the introduction port 10 as the first communication portion which communicates with the inside of the cylinder head CH and which introduces the cooling water from the inside of the cylinder head CH. The first housing 11 is fixed to the cylinder head CH through a first flange portion 11a which is formed in the outer periphery of the first housing 11. In addition, the other end side of the first housing 11 is closed by an end wall 11b which defines the reduction gear mechanism accommodating portion 14, and is joined to the second housing 12 through a second flange portion 11c which is integrally formed with the end wall 11b. In addition, a shaft insertion hole 11d through which the rotation shaft 2 is supported by insertion of the rotation shaft 2 penetrates one end side region in the width direction of the end wall 11b. Further, a motor fitting hole 11e through which the inner end part (the end part of the output shaft 4b side) of the electric motor 4 is supported by insertion and fitting of the end part of the output shaft 4b side penetrates the other end side region in the width direction of the end wall 11b.

As shown in FIG. 1 to FIG. 5, the valve body accommodating portion 13 is provided, at the outer peripheral portion thereof, with the substantially cylindrical first to third discharge ports E1 to E3 as the second communication portion which connect to the first to the third pipes L1 to L3. Each of the first to the third discharge ports E1 to E3 has a predetermined different inner diameter, and projects from the outer peripheral portion along the radial direction of the valve body accommodating portion 13. That is, the first discharge port E1 having a medium diameter, which connects to the heater heat exchanger HT, and the second discharge port E2 having a small diameter, which connects to the oil cooler OC, are arranged parallel so as to be adjacent to each other along the axial direction of the valve body accommodating portion 13. The first discharge port E1 is provided at the end wall 11b side, while the second discharge port E2 is provided at the introduction port 10 side. On the other hand, the third discharge port E3 having a large diameter, which connects to the radiator RD, is provided in a different circumferential direction position from the first and the second discharge ports E1 and E2 and is set so as to overlap with the first and the second discharge ports E1 and E2 in the axial direction.

Cylindrical first to third seal holding members H1 to H3 are respectively fitted to the base end sides of the first to the third discharge ports E1 to E3. Circular first to third seal members S1 to S3 to liquid-tightly seal a gap between each of the discharge ports E1 to E3 and the outer peripheral surface (after-mentioned first to third axial direction regions X1 to X3) of the valve body 3 are provided at the end parts of the first to the third seal holding members H1 to H3 opposing to the valve body 3 so as to make sliding contact with the outer peripheral surface of the valve body 3. Specifically, the seal members S1 to S3 are respectively inserted into and fitted to first to third seal holding portions H1a to H3a, each of which is formed by cutting out the inner peripheral edge of the end part of the first to the third seal holding members H1 to H3. The seal holding members H1 to H3, to which the seal members S1 to S3 are respectively fitted, are respectively press-fitted to the inner peripheral surfaces of first to third seal attachment portions E1a to E3a that are formed at the end parts of the discharge ports E1 to E3 and have a reduced diameter step.

In addition, first to third adapter holding portions E1b to E3b to accommodate and hold cylindrical first to third adapters A1 to A3 respectively connecting to pipes (not shown) are provided at the tip end sides of the first to the third discharge ports E1 to E3. The adapters A1 to A3 are respectively press-fitted to the inner peripheral surfaces of the adapter holding portions E1b to E3b by being inserted into and fitted to the adapter holding portions E1b to E3b so as to butt to the step parts of the seal attachment portions E1a to E3a.

Here, all of the first to the third adapters A1 to A3 are formed into the same shape. The first to the third adapters A1 to A3 respectively have first to third held portions A1a to A3a which are respectively press-fitted to the adapter holding portions E1b to E3b and first to third pipe attachment portions A1b to A3b to which the first to the third pipes L1 to L3 are fixed. With this configuration, the pipes L1 to L3 made of material having flexibility such as rubber are respectively fitted onto the outer peripheral surfaces of the pipe attachment portions A1b to A3b and fastened by band members (not shown) winding around their outer peripheral surfaces.

As shown in FIG. 2 to FIG. 4, the second housing 12 has a square bracket-shape in cross section, formed so that one end side of the second housing 12, which faces to the first housing 11, opens. This opening portion is connected to the first housing 11 by being fitted to a projection portion that is formed on the outer peripheral edge of the second flange portion 11c, and the reduction gear mechanism accommodating portion 14 is then defined. Here, with regard to the connection of the housings 11 and 12, the inside of the reduction gear mechanism accommodating portion 14 is liquid-tightly sealed by setting a ring-shaped seal member SL between the projection portion of the first housing 11 and the opening portion of the second housing 12.

The rotation shaft 2 is rotatably supported by the bearing 6 that is provided in the shaft insertion hole 11d through a bearing portion 2a provided in the middle part, in the axial direction, of the rotation shaft 2. In addition, one end part of the rotation shaft 2 is formed as a valve body attachment portion 2b for fixing the rotation shaft 2 to the valve body 3, which has substantially the same diameter as that of the bearing portion 2a. The other end part of the rotation shaft 2 is formed as a gear attachment portion 2c, which has a relatively smaller diameter than that of the bearing portion 2a, for fixing the rotation shaft 2 to the after-mentioned third gear G3 of the reduction gear mechanism 5. Moreover, a large diameter seal portion 2d having enlarged diameter steps is provided between the bearing portion 2a and the valve body attachment portion 2b. A pair of a first and a second seal rings R1 and R2 is arranged in series on the outer periphery of this seal portion 2d. By these seal rings R1 and R2, the cooling water in the valve body accommodating portion 13 is prevented from flowing into the reduction gear mechanism accommodating portion 14.

Here, regarding the seal rings R1 and R2, it is preferable that the outer peripheral surfaces of the seal rings R1 and R2 undergo a low friction treatment that reduces a frictional resistance (a sliding resistance), such as fluororesin coating. With this treatment, the sliding resistance of the rotation shaft 2 is reduced, and power consumption of the electric motor 4 is reduced.

In addition, the seal portion 2d is provided, between the seal rings R1 and R2, with a part that opens and connects to a drain hole 11f penetrating the shaft insertion hole 11d of the first housing 11 in a radial direction. The cooling water that might leak between the seal rings R1 and R2 from the valve body accommodating portion 13 side over the seal portion of the first seal ring R1 can therefore be discharged to the outside through this drain hole 11f.

Figure 7A:
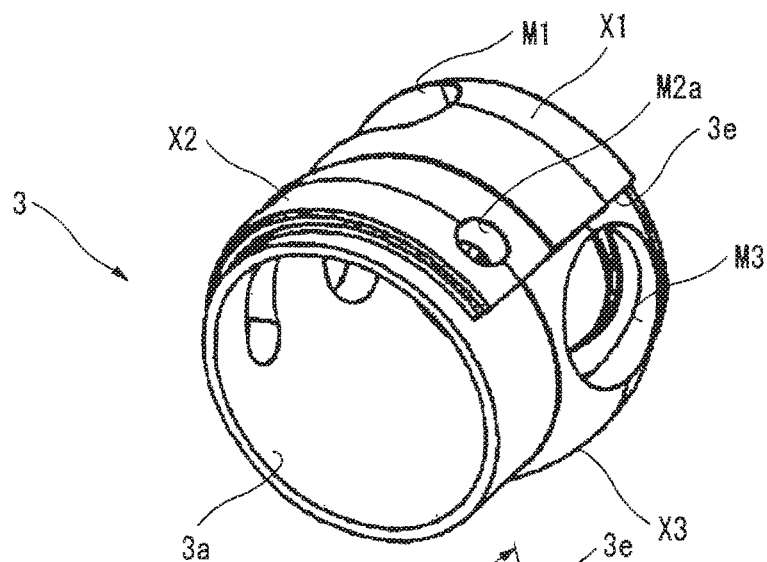
FIG. 7(*a*) to FIG. 7(*c*) are perspective views showing only a valve body shown in FIG. 2, viewed from different viewpoint.
Figure 7B:
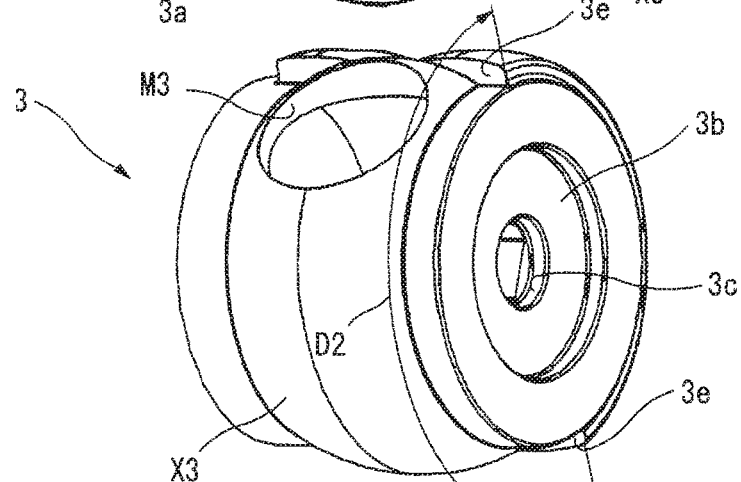
Figure 7C:
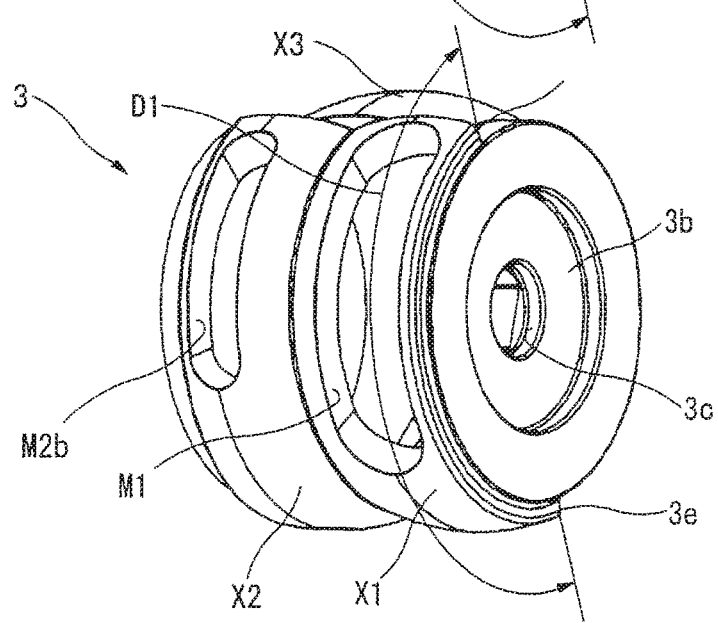

As shown in FIG. 2, FIG. 4 and FIG. 7, one end in the axial direction of the valve body 3 is opened as an inflow port 3a to take the cooling water into its inner peripheral side space from the introduction port 10 of the first housing 11. The other end in the axial direction of the valve body 3 is closed by an end wall 3b. A cylindrical shaft fixing portion 3c for fixing the valve body 3 to the rotation shaft 2 penetrates, along the axial direction, a center part of the end wall 3b, which corresponds to the axial center of the valve body 3. The valve body 3 is press-fitted onto the outer periphery of the valve body attachment portion 2b of the rotation shaft 2 through an insert member 3d made of a metal material that is fixedly provided on the shaft fixing portion 3c.

The valve body 3 operates by rotation movement within a range of an angle of about 180 degrees. The valve body 3 has different shapes according to each region in its axial direction and circumferential direction. That is, in a first semicircle region D1 of the valve body 3, which faces to the first and the second discharge ports E1 and E2, an oval hole-shaped first opening portion M1 is formed, along the circumferential direction, in a first axial direction position P1 that is the same axial direction center as the first discharge port E1 in a first axial direction region X1 located at the axial direction other end side (the end wall 3b side). The first opening portion M1 is set to an axial direction width so as to completely overlap with the first discharge port E1 in the axial direction. Further, a second opening portion M2 including a second perfect circle opening portion M2a and a second oval opening portion M2b having an oval hole shape are formed in a second axial direction position P2 that is the same axial direction center as the second discharge port E2 in a second axial direction region X2 located at the axial direction one end side (the introduction port 10 side). The second perfect circle opening portion M2*a* and the second oval opening portion M2*b* are set to an axial direction width so as to completely overlap with the second discharge port E2 in the axial direction.

On the other hand, in a second semicircular region D2 of the valve body 3, which faces to the third discharge port E3, a circular third opening portion M3 is formed in a third axial direction position P3 that is the same axial direction center as the third discharge port E3 in a third axial direction region X3 located in the middle of the axial direction. The third opening portion M3 is set to an axial direction width so as to completely overlap with the third discharge port E3. Moreover, the first to the third axial direction regions X1 to X3 have a spherical shape in a longitudinal cross section, namely that the first to the third axial direction regions X1 to X3 are shaped into a curved surface shape having a same curvature C, and the curvature C is the same as the radius of the rotation of the valve body 3.

Here, each shapes and each circumferential direction position of the first to the third opening portions M1 to M3 are set so that their communication states with the first to the third discharge ports E1 to E3 are changed by the rotation of the valve body 3 in an order from first to fifth states, which are shown in FIG. 8 and described later. With this setting, the circumferential length of the valve body 3, i.e. the outer diameter of the valve body 3, can be minimized.

In addition, the first to the third axial direction regions X1 to X3 of the valve body 3 are formed into the spherical shape, and by this, step portions 3*e*, 3*e* are formed at boundary parts between the semicircle regions D1 and D2. With this, when the valve body 3 is rotated, it is possible to restrain or limit the rotation of the valve body 3 by using each of these step portions 3*e*, 3*e* as a stopper. These step portions 3*e*, 3*e* are necessarily formed when forming the valve body 3. Therefore, by using these step portions 3*e*, 3*e*, there is no need to specially provide the stopper, and this leads to cost reduction etc.

As to the electric motor 4, as shown in FIG. 2 and FIG. 4, by inserting the inner end part (an end part at the output shaft 4*b* side) of a motor housing 4*a* as an exterior into the motor insertion hole lie, the electric motor 4 is fixed to the first housing 11. The electric motor 4 is controlled by a vehicle-mounted electronic controller (not shown), and controls the rotation of the valve body 3 according to a vehicle operating condition, and the electric motor 4 therefore realizes proper distribution of the cooling water to the radiator RD etc. In addition, as one example, as to a circulation cooling start temperature corresponding to the after-mentioned control temperature CT at which the distribution of the cooling water to the radiator RD side starts, it is set at approximately 95° C.

The reduction gear mechanism 5 has a circular first gear G1 as a driving gear that is fixed to the outer periphery of the output shaft 4*b* of the electric motor 4 so as to be able to integrally rotate with the output shaft 4*b* and has a first teeth portion G1*a* on the outer periphery of the first gear G1, a circular second gear G2 as an intermediate gear that is fixed to the outer periphery of a support shaft 9 so as to be able to integrally rotate with the support shaft 9 rotatably supported at a middle position in the width direction of the first housing 11 and has a second teeth portion G2*a* meshing with the first teeth portion G1*a* on the outer periphery of the second gear G2, and the substantially semicircular third gear G3 as a driven gear that is fixed to the outer periphery of the gear attachment portion 2*c* of the rotation shaft 2 so as to be able to integrally rotate with the rotation shaft 2 and has a third teeth portion G3*a* meshing with the second teeth portion G2*a* on the outer periphery of the third gear G3.

That is, with this gear arrangement, the second gear G2 is driven and rotated by the driving force of the electric motor 4 that is transmitted from the first gear G1, and the third gear G3 is rotated within a predetermined angle range by the driving force that is transmitted from the second gear G2. At this time, as to the third gear G3, its rotation is restrained or limited so as not to exceed the predetermined angle range by the contact of each of both ends in the circumferential direction of the third gear G3 with an arcuate stopper portion 11*g* projecting from the surface of the end wall 11*b* facing to the second housing 12.

As particularly shown in FIG. 2 and FIG. 6, the switching control valve SV mainly has a valve plate member 21 as an opening and closing portion to open and close the communication passage 20, switching control valve SV which is provided in the communication passage 20 so as to be able to move, a well-known thermo-element 22 as a temperature sensing part to urge the valve plate member 21 in an opening direction by expanding the thermo-element 22 according to the temperature of the cooling water, thermo-element 22 which is provided so as to link with the valve plate member 21, and a coil spring 23 which is provided so as to face to the thermo-element 22 with the valve plate member 21 therebetween and which urges the valve plate member 21 in a closing direction. In addition, a sign "24" in the drawing is a plug for the seating of the coil spring 23 by closing an opening portion formed for forming the communication passage 20.

That is, as shown in FIG. 6, the communication passage 20 has an inflow hole 20*a* opened at the valve body accommodating portion 13 side, an outflow hole 20*b* opened at the third discharge port E3 (the third adapter A3) side so as to cross the inflow direction of the cooling water from the inflow hole 20*a*, and a valve accommodating portion 20*c* which is provided between the holes 20*a* and 20*b* and which accommodates the switching control valve SV. The communication and the shutoff of the holes 20*a* and 20*b* are switched by moving the valve plate member 21 placed between the thermo-element 22 provided at the opening end portion of the outflow hole 20*b* and the coil spring 23 provided so as to face to the thermo-element 22 according to the urging force of the thermo-element 22 and the coil spring 23.

As to the thermo-element 22, a well-known wax (not shown) which expands at a predetermined setting temperature (approximately 105° C.) corresponding to the after-mentioned valve opening temperature VT of the switching control valve SV is filed in its inside. A rod 22*a* sticks out forward (hereinafter, called "extension") by expanding the wax, and the valve plate member 21 is then urged. In addition, as an extension member, it is not only formed of the thermo-element 22 but also can be made of a shape memory alloy material such as a bimetal. In addition, a passage forming portion 22*b* for the flow of the cooling water is provided at the outer peripheral side of the thermo-element 22. The cooling water can flow from the inflow hole 20*a* side to the outflow 20*b* side through the passage forming portion 22*b* when the valve plate member 21 opens.

More specifically, the thermo-element 22 facing to the inside of the valve body accommodating portion 13 through the inflow hole 20*a* detects the temperature of the cooling water. In a state in which the temperature of the cooling water is lower than the setting temperature, the thermo-element 22 does not extend, and the inflow hole 20a is closed (valve closed state) by urging the valve plate member 21 to one end side of the switching control valve SV according to the urging force of the coil spring 23. On the other hand, when the temperature of the cooling water exceeds the setting temperature, the thermo-element 22 extends against the urging force of the coil spring 23, and consequently, the valve plate member 21 is urged to the other end side of the switching control valve SV according to the urging force of this thermo-element 22, and thereby communicating the inflow hole 20a with the outflow hole 20b (valve opened state) through the passage forming portion 22b.

In the following, the specific operation of the flow rate control valve CV is explained based on FIG. 8. For the convenience of the explanation, to distinguish a relative relationship between the discharge ports E1 to E3 and the respective opening portions M1 to M3, in FIG. 8, the first to the third opening portions M1 to M3 of the valve body 3 are drawn by a broken line, the first to the third discharge ports E1 to E3 of the first housing 11 are shown by hatching, and a state in which the E1 to E3 respectively communicate with M1 to M3 is painted black.

That is, the electric motor 4 is controlled by control current calculated based on the vehicle operating condition and outputted from the electronic controller (not shown), and the rotation position (a phase) of the valve body 3 of the flow rate control valve CV is controlled so that the relative relationship between the discharge ports E1 to E3 and the respective opening portions M1 to M3 is in the following each state according to the vehicle operating condition.

Figure 8A:
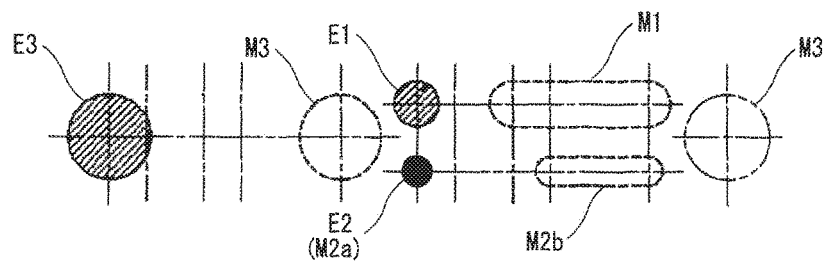
FIG. 8(*a*) to FIG. 8(*e*) are drawings showing developed views of a valve body accommodating portion to explain a control pattern of the flow rate control valve shown in FIG. 5.

In a first state shown in FIG. 8(a), only the second opening portion M2 (M2a) is in a communication state. The first and the third opening portions M1 and M3 are in a non-communication state. With this, in the first state, based on the communication state, the cooling water is supplied to only the oil cooler OC from the second discharge port E2 through the second pipe L2. Further, by changing an overlapping amount between E2 and M2 with M2 shifted with respect to E2, it is possible to change a supply rate to the oil cooler OC.

Figure 8B:
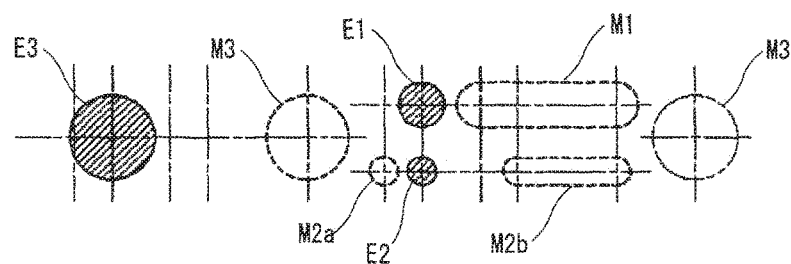

Next to the first state, in a second state shown in FIG. 8(b), all of the first to the third opening portions M1 to M3 are in the non-communication state with the discharge ports E1 to E3. With this, in the second state, the cooling water is not supplied to any of the heater heat exchanger HT, the oil cooler OC and the radiator RD.

Figure 8C:
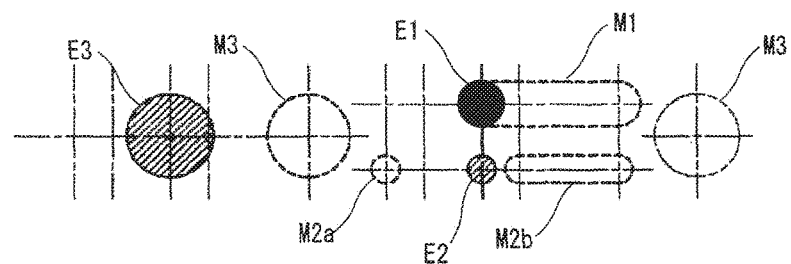

Next to the second state, in a third state shown in FIG. 8(c), only the first opening portion M1 is in the communication state. The second and the third opening portions M2 and M3 are in the non-communication state. Therefore, in the third state, based on this communication state, the cooling water is supplied to only the heater heat exchanger HT from the first discharge port E1 through the first pipe L1. Further, by changing an overlapping amount between E1 and M1 with M1 shifted with respect to E1, it is possible to change a supply rate to the heater heat exchanger HT.

Figure 8D:
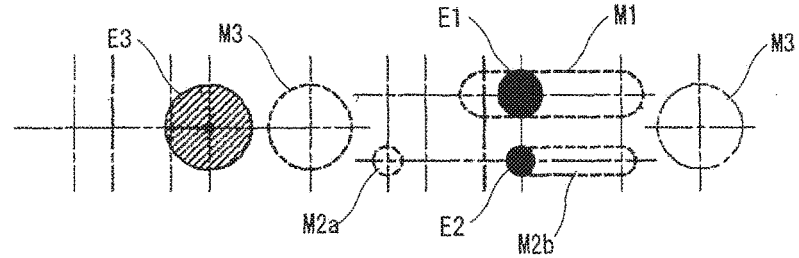

Next to the third state, in a fourth state shown in FIG. 8(d), only the third opening portion M3 is in the non-communication state. The first and the second opening portions M1 and M2 (M2b) are in the communication state. Therefore, in the fourth state, based on these communication states, the cooling water is supplied to the heater heat exchanger HT and the oil cooler OC from the first and the second discharge ports E1 and E2 through the first and the second pipes L1 and L2. Further, by changing overlapping amounts between E1 and M1 and between E2 and M2 with M1 and M2 shifted with respect to E1 and E2 respectively, it is possible to change supply rates to the heater heat exchanger HT and to the oil cooler OC.

Figure 8E:
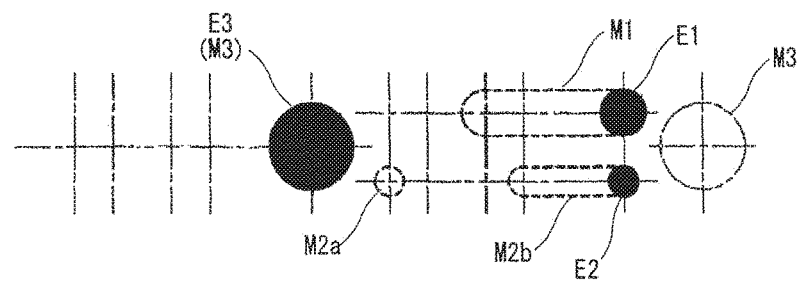
Figure 9:
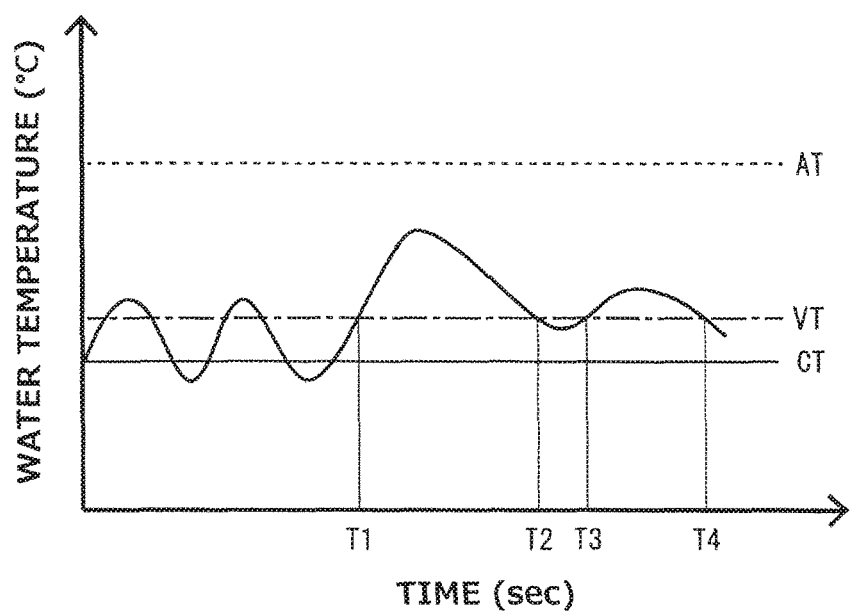
FIG. 9 is a graph showing a change in water temperature controlled by the cooling control device according to the present invention.

Next to the fourth state, in a fifth state shown in FIG. 8(e), all of the first to the third opening portions M1 to M3 are in the communication state with the discharge ports E1 to E3. Therefore, in the fifth state, the cooling water is supplied to all of the heater heat exchanger HT, the oil cooler OC and the radiator RD. Further, by changing overlapping amounts between E1 and M1, between E2 and M2 and between E3 and M3 with M1, M2 and M3 shifted with respect to E1, E2 and E3 respectively, it is possible to change the supply rates to the heater heat exchanger HT, to the oil cooler OC and to the radiator RD.

In the following, the unique operation of the cooling control device CM, that is, the specific operation of the switching control valve SV cooperating with the flow rate control valve CV is explained based on specifically FIG. 4, FIG. 6, FIG. 9 and FIG. 10. In addition, in each FIG. 9 and FIG. 10, a thin solid line shows the after-mentioned control temperature CT, a thin broken line shows the after-mentioned abnormal temperature AT, and a thin alternate long and short dash line shows the valve opening temperature VT of the switching control valve SV.

That is, as to the cooling control device CM, when the temperature of the cooling water reaches the predetermined control temperature CT (approximately 95° C.), the flow rate control valve CV becomes in the fifth state by the driving rotation of the electric motor 4 based on the information of the water temperature, and the circulation cooling to the radiator RD side then starts. By this water supply to the radiator RD side, the increase of the temperature of the cooling water (hereinafter, simply called "water temperature") is suppressed, and the water temperature is controlled at the control temperature CT.

On the other hand, in a case where the water temperature increases and reaches the valve opening temperature VT (approximately 105° C.) of the switching control valve SV even in the maximum flow rate of the cooling water which can be supplied to the radiator RD side through the flow rate control valve CV (the third opening portion M3) when the load of the engine EG is high, the thermo-element 22 (the wax which is not shown in the drawings) expands and the switching control valve SV opens. With this, in addition to the flow rate control valve CV (the third opening portion M3), the cooling water is also supplied to the radiator RD side through the communication passage 20. By this, the flow rate of the cooling water further increases by the communication passage 20, and thereby quickly decreasing the water temperature and controlling the water temperature to a preferable temperature.

Here, until now, as mentioned above, the second control valve such as the switching control valve SV has been used as a fail-safe valve which operates in a case where the abnormality or the failure of a cooling system occurs caused by the failure of the first control valve such as the flow rate control valve CV. With this use mode, the valve opening temperature is also set at the abnormal temperature AT (approximately 120° C.) that is a temperature close to the allowable limit of the water temperature. As a result, it is necessary to maintain a large flow rate of the water supply of the second control valve to quickly decrease the water temperature that is high temperatures caused by the abnormality or the failure of the cooling system. As that result, while maintaining the necessary and sufficient flow rate of the water supply of the first control valve in the normal use time, it is also necessary to maintain the necessary and sufficient flow rate of the water supply of the second control valve at the time of the system abnormality, and the sizes of the both of the control valves are therefore obliged to be large. With this, the size of the overall cooling control device becomes large.

On the other hand, the cooling control device CM is formed so as to control the water temperature by the cooperation of the flow rate control valve CV and the switching control valve SV, and consequently, the flow rate of the water supply can be further increased by the volume of the switching control valve SV, that is, the volume of the communication passage 20. With this, while maintaining the necessary flow rate of the water supply by the switching control valve SV in the abnormal time, it is possible to decrease the size of the flow rate control valve CV (the valve body 3) by the increase of the flow rate of the water supply by the switching control valve SV.

Figure 10:
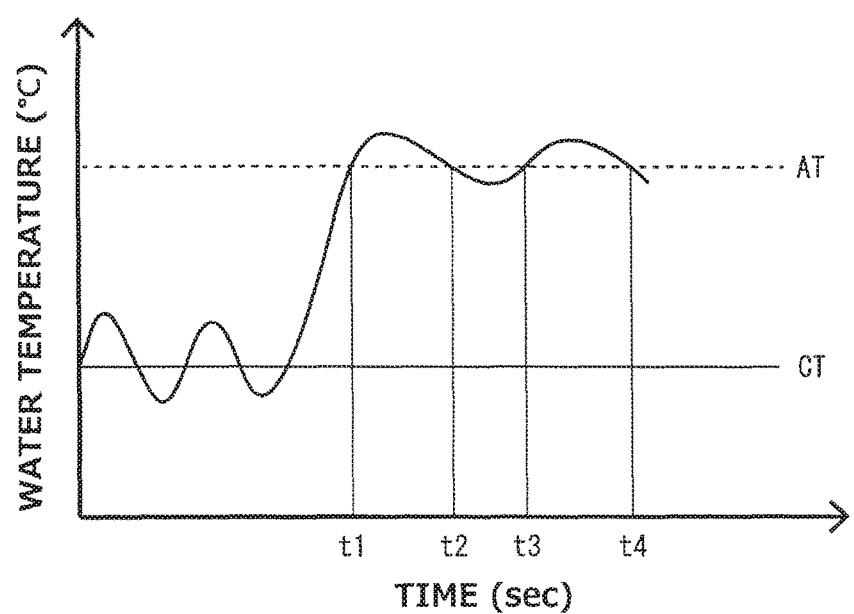
FIG. 10 is a graph showing a change in water temperature controlled by the related art cooling control device.

In addition, until now, as to the second control valve, the valve opening temperature has been set at the abnormal temperature AT based on the use mode as the fail-safe valve mentioned above. With this, as shown in FIG. 10, when the water temperature becomes below the abnormal temperature AT by the opening of the second control valve (a time t1 in FIG. 10), the second control valve is immediately closed (a time t2 in FIG. 2), and consequently, the water temperature increases again and quickly reaches the abnormal temperature AT (a time t3 in FIG. 10), following which the second valve therefore opens and when the water temperature becomes below the abnormal temperature AT, the second control valve is immediately closed again (a time t4 in FIG. 10). These are repeated, and the water temperature is, as a result, controlled around the abnormal temperature AT. As this result, a large load is applied to the engine, and thereby there is a fear about that the engine is damaged.

On the other hand, in the cooling control device CM, based on the cooperation control configuration of the flow rate control valve CV and the switching control valve SV mentioned above, the valve opening temperature VT of the switching control valve SV is set to a relatively low temperature, and it is set to a temperature around the control temperature CT controlled by the flow rate control valve CV. The water temperature is therefore lowered to at least the valve opening temperature VT (a time T2 in FIG. 9) of the switching control valve SV, which is close to the control temperature CT, by the opening of the switching control valve SV (a time T1 in FIG. 9). With this, after that, even if the water temperature increases again, the switching control valve SV opens again (time T3 in FIG. 9) at the valve opening temperature VT that is sufficiently lower than the abnormal temperature AT. Consequently, the water temperature is lowered to the valve opening temperature VT (a time T4 in FIG. 9) without reaching the abnormal temperature AT, and the water temperature can therefore be controlled at a temperature around the valve opening temperature VT. As that result, it is possible to reduce the load applied to the engine EG caused by the increase of the water temperature, and there is also no fear about a conventional damage to the engine EG.

Furthermore, in the cooling control device CM, as mentioned above, it is possible to reduce the size of the flow rate control valve CV by the flow rate of the water supply increased by the switching control valve SV, and the size of the cooling control device CM can therefore be reduced while maintaining the flow rate of the water supply required at the time of the abnormality by the switching control valve SV.

In addition, in the cooling control device CM, the switching control valve SV opens at a temperature sufficiently lower than a temperature at which the conventional fail-safe valve opens. A conventional problem that the water temperature is raised to the abnormal temperature AT can therefore be suppressed even if the flow rate control valve CV fails. With this, the size of the switching control valve SV itself can be reduced, and the size of the cooling control device CM is further reduced.

As the above, according to the cooling control device CM according to the present embodiment and a cooling control method in which the cooling control device CM is used, there is configured so that the flow rate of the cooling water supply is controlled by the cooperation of the flow rate control valve CV and the switching control valve SV. The size of the flow rate control valve CV can therefore be reduced by the flow rate of the water supply increased by the switching control valve SV while maintaining the flow rate of the water supply required at the time of the abnormality by the switching control valve SV. With this, it is possible to reduce the size of the overall cooling control device CM.

Moreover, as to the cooperation control by the above control valves CV and SV, by setting the valve opening temperature of the switching control valve SV to be higher than the valve opening temperature of the flow rate control valve CV, it is possible to not only operate as the conventional fail-safe in the abnormal time of the cooling system but also control the water temperature by only the flow rate control valve CV in a case where a large increase in the water temperature does not occur when the cooling system normally operates. There is therefore no fear about problems such as over cooling.

Furthermore, by setting the valve opening temperature of the switching control valve SV to be a temperature around the control temperature CT in the normal time, the control temperature zone of the water temperature in the abnormal time mentioned above can be set low, and it is, as a result, also protect the engine in the abnormal time.

In addition, in the case of the cooling control device CM, the flow rate control valve CV and the switching control valve SV are integrally formed. Various kinds of merits such as the reduction of the size of the overall device and resulting improvement of a layout property can therefore be obtained by suppressing the switching control valve SV from being enlarged.

Moreover, the switching control valve SV is provided in the radial direction side of the rotation (an outer peripheral side) of the valve body 3 in the housing 1, and the size of the cooling control device CM or the flow rate control valve CV in the axial direction can therefore be reduced. In particular, the switching control valve SV is provided so as to overlap with the valve body 3 in the axial direction of the rotation of the valve 3. The reduction of the size of the cooling control device CM or the flow rate control valve CV can therefore be further effectively possible.

Furthermore, the switching control valve SV is provided so as to be adjacent to the third discharge port E3. With this, it becomes possible to further effectively dispose the switching control valve SV, and further reduction of the size of the cooling control device CM or the flow rate control valve CV can therefore be possible.

In addition, the opening and closing structure of the switching control valve SV is formed by the above-mentioned mechanical structure. With this, the above cooperation control structure can be possible by a simple structure, and the increase of the manufacturing cost of the cooling control device CM or the flow rate control valve CV can, as a result, also be possible. In particular, by adopting the thermo-element 22 as the extension member, the cooperation control structure can be possible more simply and with lower cost.

First Variation

Figure 11:
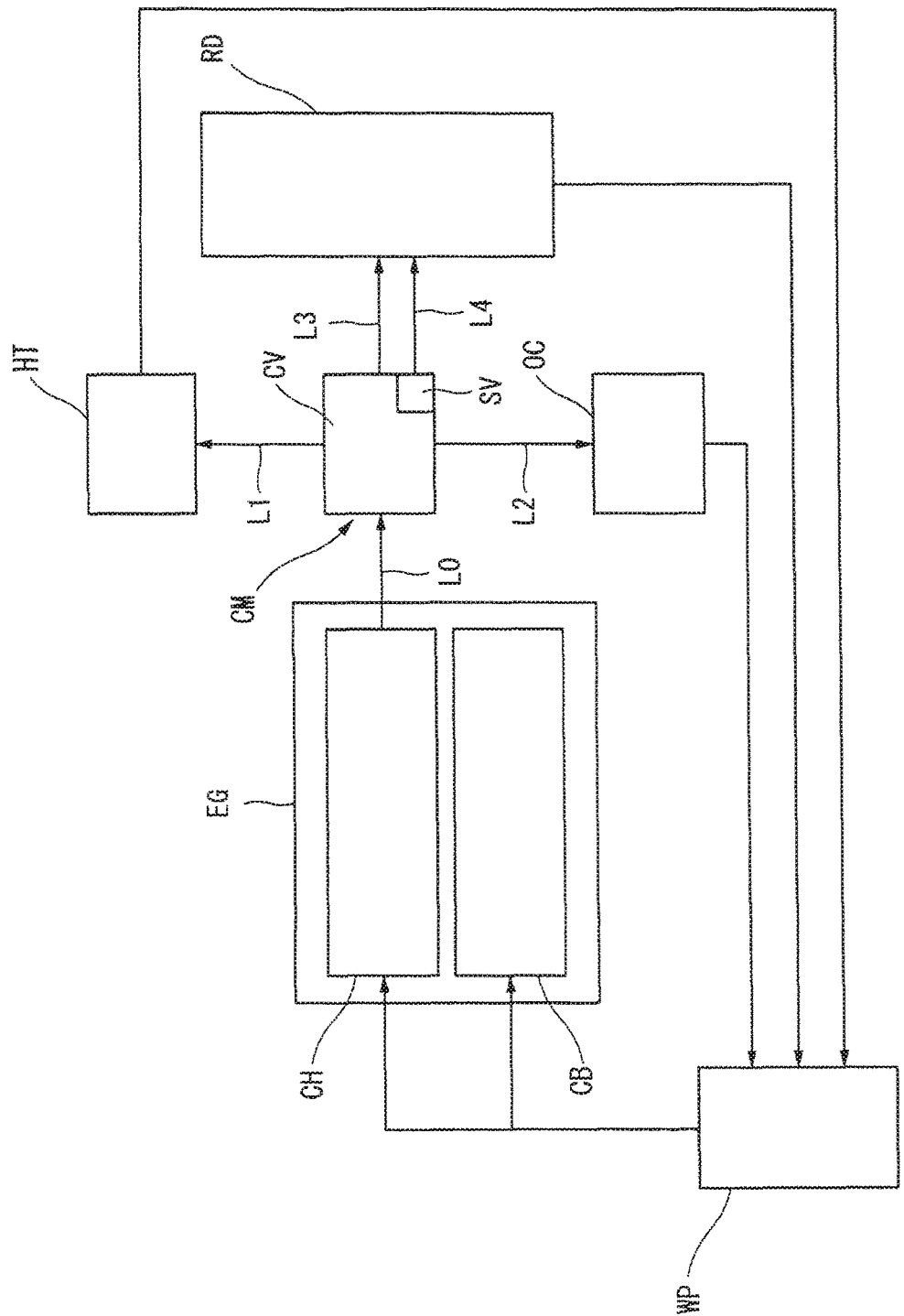
FIG. 11 is a schematic system diagram of a circulation system of the cooling water for the vehicle, showing a first variation in the first embodiment of the cooling control device according to the present invention.

FIG. 11 shows a first variation of the first embodiment. The outflow hole 20b of the switching control valve SV, outflow hole 20b which is integrally formed with the flow rate control valve CV, is connected not to the third pipe L3 but to the radiator RD through a fourth pipe L4 connecting to the radiator RD independently from the third pipe L3.

With this configuration, it is possible to surely maintain the flow rate of the water supply by an independent water supply route through the switching control valve SV. Moreover, even in a case where the water supply by the third pipe L3 becomes impossible caused by the damage of the third pipe L3, the water supply route can be maintained, and there is therefore a merit that the engine can be more sufficiently protected in the abnormal time.

Second Variation

Figure 12:
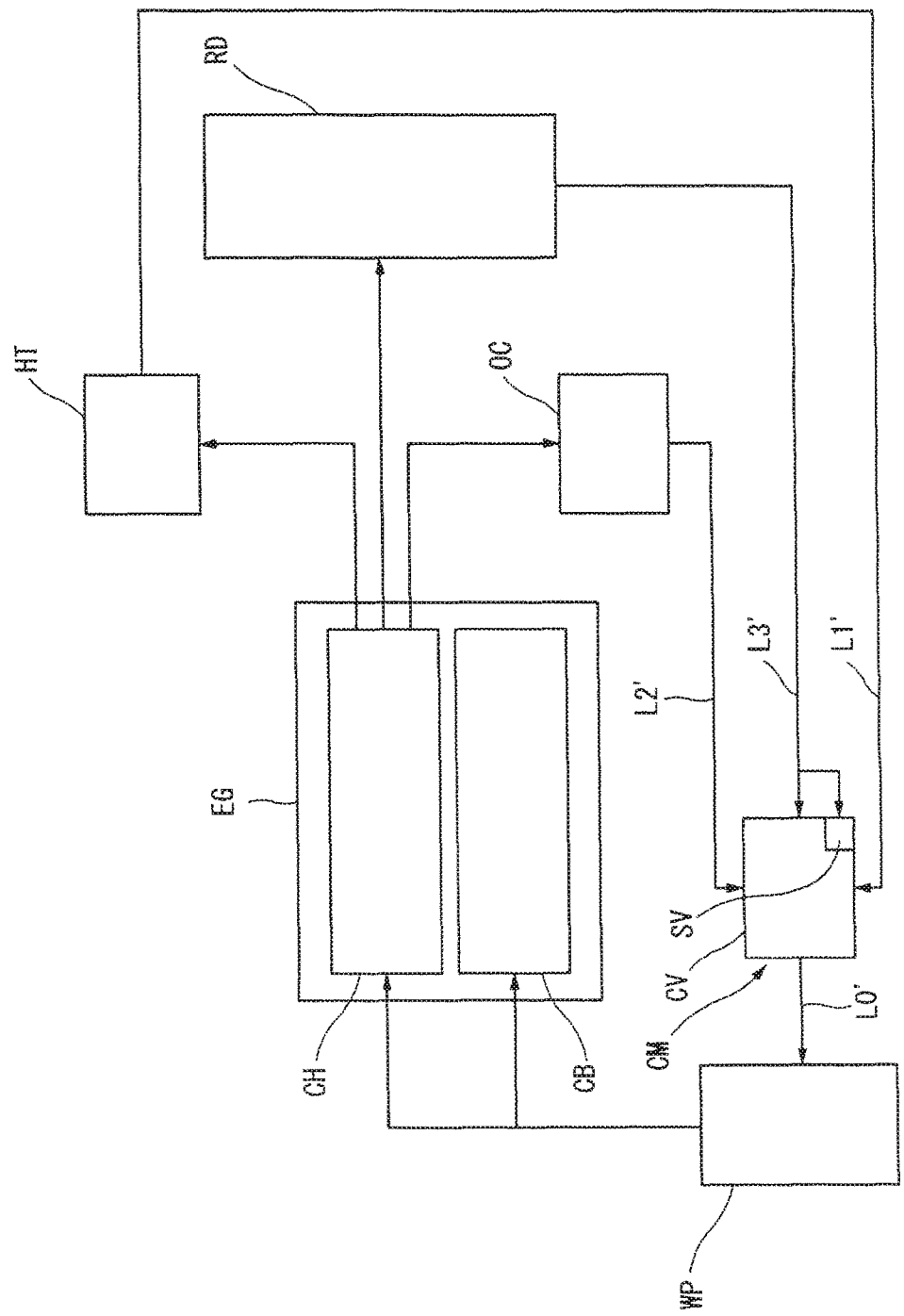
FIG. 12 is a schematic system diagram of a circulation system of the cooling water for the vehicle, showing a second variation in the first embodiment of the cooling control device according to the present invention.

FIG. 12 shows a second variation of the first embodiment. The cooling control device CM is provided not between the heater heat exchanger HT, the oil cooler OC and the radiator RD, and the engine EG but between the heater heat exchanger HT, the oil cooler OC and the radiator RD, and the water pump WP. The cooling water is introduced from the heater heat exchanger HT, the oil cooler OC and the radiator RD sides respectively through pipes L1', L2' and L3', and supplied to the water pump WP through an outlet pipe L0'.

In this way, in a case where the flow direction of the cooling water in the cooling control device CM is reversed, that is, in a case where the cooling water flows from each of the discharge ports E1 to E3 to the outlet port 10, the same working effect as that of the first embodiment can be also obtained.

Second Embodiment

Figure 13:
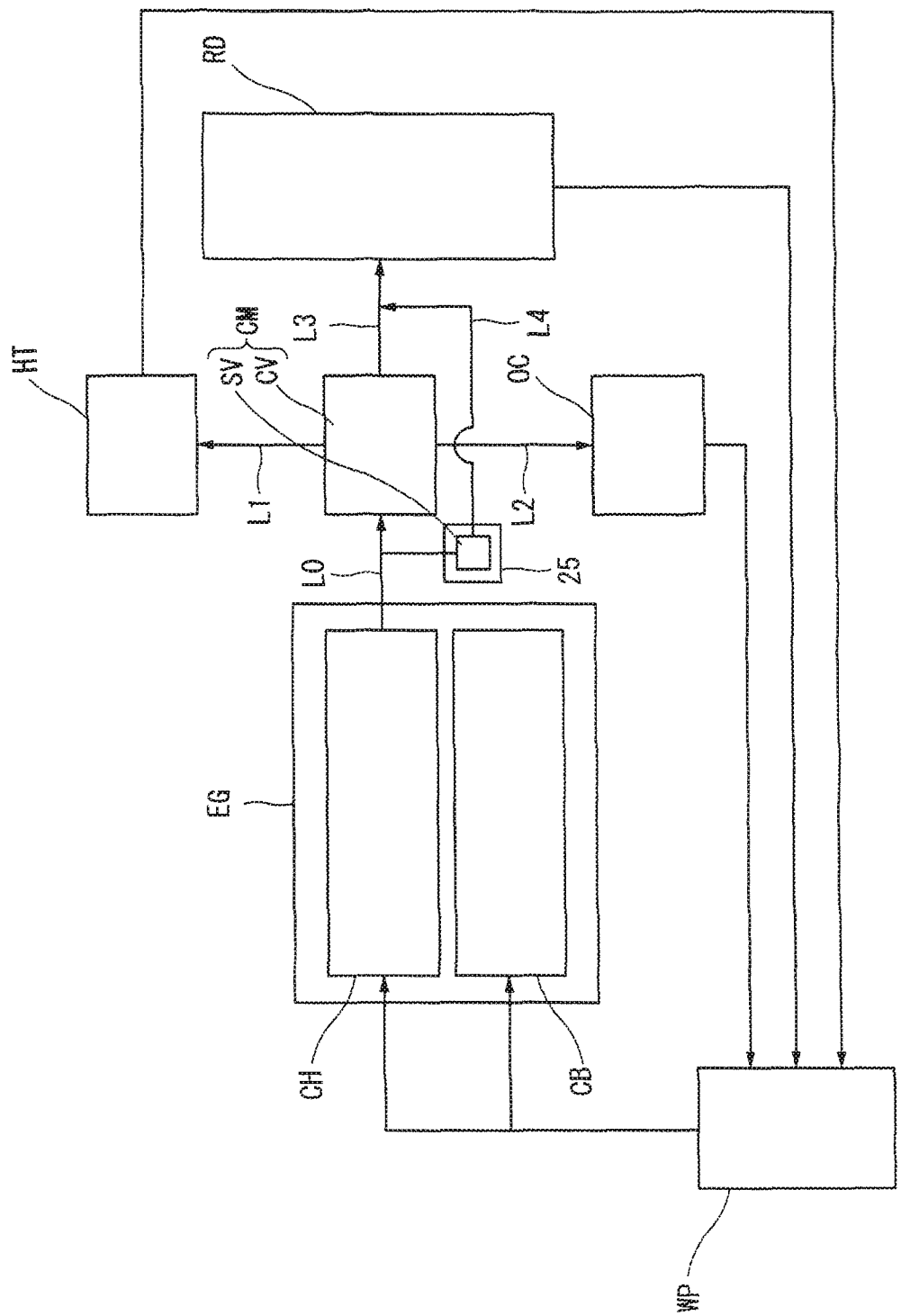
FIG. 13 is a schematic system diagram of a circulation system of the cooling water for the vehicle, showing a second embodiment of the cooling control device according to the present invention.

FIG. 13 shows a second embodiment of the cooling control device according to the present invention. The switching control valve SV in the first embodiment is formed separately from the flow rate control valve CV. In addition, the configuration of the switching control valve SV other than the position of the switching control valve SV is the same as that of the first embodiment.

That is, in the present embodiment, the switching control valve SV is accommodated in a casing 25 provided between the engine EG and flow rate control valve CV, and formed so as to bypass-communicate the introduction passage L0 of the cooling water from the cylinder head CH side and the third pipe L3.

In this way, by providing the switching control valve SV separately from the flow rate control valve CV, the layout property of the switching control valve SV can be improved.

Variation

Figure 14:
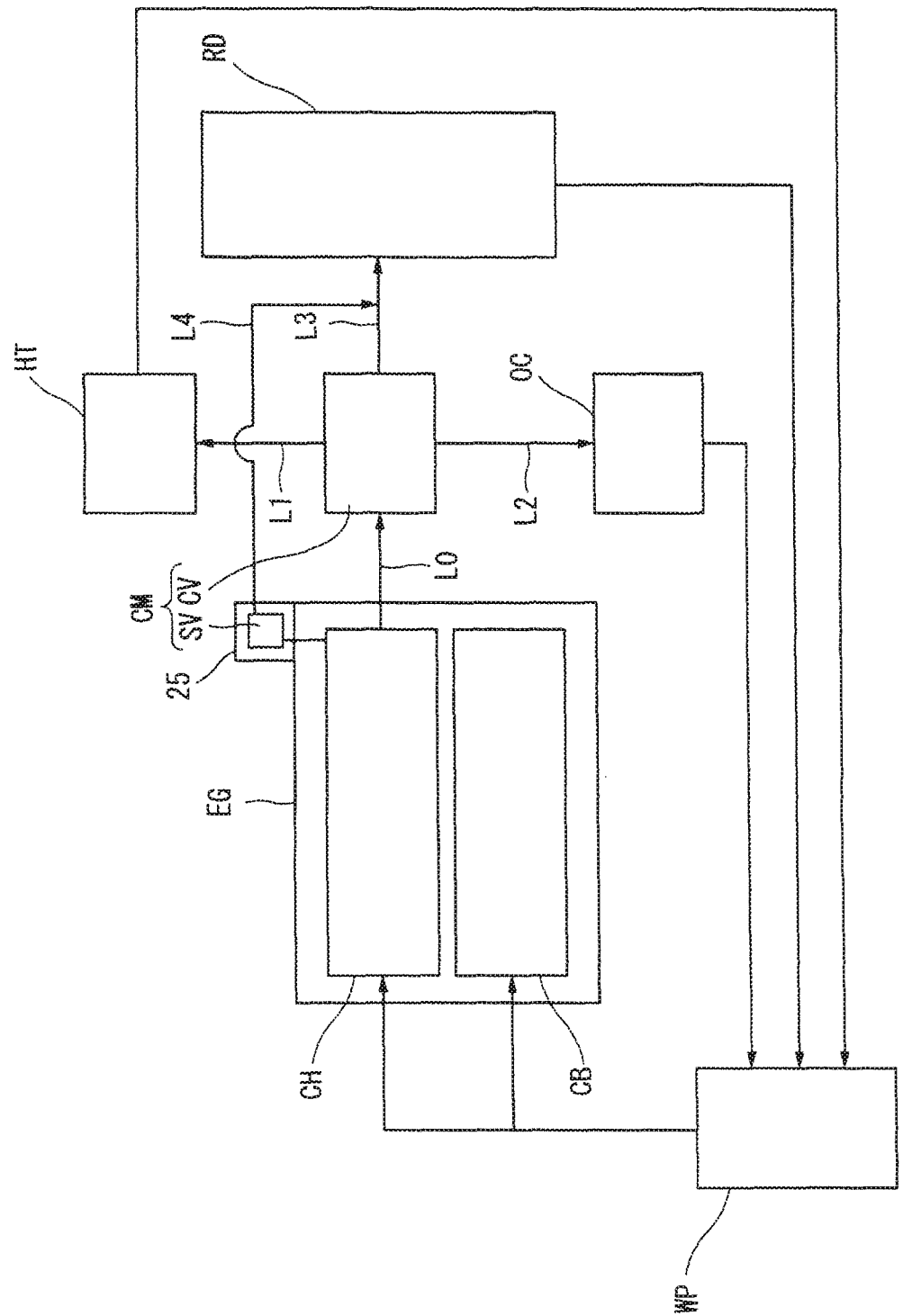
FIG. 14 is a schematic system diagram of a circulation system of the cooling water for the vehicle, showing a variation in the second embodiment of the cooling control device according to the present invention.

FIG. 14 shows a variation of the second embodiment. The switching control valve SV is provided at the engine EG side, that is, it is integrally formed with the engine EG.

In this way, by integrally forming the switching control valve SV with the engine EG, it becomes possible to quickly detect the water temperature raised in the inside of the engine EG, and thereby more effectively controlling the water temperature.

The present invention is not limited to the configuration of each of the embodiments described above. For example, regarding the specific configurations of the flow rate control valve CV and the switching control valve SV, as long as the above-mentioned working effect can be obtained, these can be freely changed and modified according to specifications, etc. of the vehicle in which the cooling control device CM of the present invention is mounted.

In addition, in each of the embodiments described above, although the present invention has been explained as one example in which the cooling control device CM is applied to the circulation system of the cooling water, it is needless to say that the cooling control device CM can be applied to not only the cooling water but various fluid such as lubrication oil.

Moreover, with regard to the opening and closing structure of the switching control valve SV, in addition to the mechanical structure shown in the first embodiment, it is also possible to be formed by, for example, an electromagnetic structure, that is, an actuator, such as an electromagnetic solenoid which operates based on the detection result of a water temperature sensor (not shown in the drawings) mounted on the vehicle. In this case, as compared with a case in which the mechanical structure is adopted, there is a merit that the opening and closing accuracy of the switching control valve SV can be improved.

In the following, technical ideas which are not disclosed in scope of claims and can be understood from the embodiments described above are explained.

(a) In the cooling control device for cooling an internal combustion engine according to claim 4, the cooling control device is characterized in that the second control valve is provided at the internal combustion engine side.

With this configuration, it becomes possible to quickly detect a refrigerant temperature raised inside the internal combustion engine and control the cooling, and thereby further effectively controlling the refrigerant temperature.

(b) In the cooling control device for cooling the internal combustion engine according to claim 4, the cooling control device is characterized in that the second control valve is provided in the casing provided between the internal combustion engine and the first control valve.

In this way, by providing the second control valve separately from the internal combustion engine and the first control valve, it is possible to improve the layout property of the second control valve.

(c) In the cooling control device according to claim 3, the cooling control device is characterized in that the extension member is made of a shape memory alloy material.

(d) In the cooling control device according to claim 9, the cooling control device is characterized in that the actuator is the electromagnetic solenoid.

With this configuration, as compared with a case where the opening and closing of the second control valve is mechanically performed, it is possible to improve the opening and closing accuracy of the second control valve.

(e) In the cooling control device according to claim 11, the cooling control device is characterized in that the second control valve has the temperature sensing part for detecting the temperature of the refrigerant and an opening and closing portion controlled by the temperature sensing part, the temperature sensing part is disposed at the entrance side of the first communication portion, and that the opening and closing portion is disposed on a route connecting the particular second communication portion with the radiator.

(f) In the flow rate control valve according to claim 13, the flow rate control valve is characterized in that the switching control valve is disposed in the rotation radial direction side of a rotor in the housing.

With this configuration, it is possible to reduce the size of the flow rate control valve in the axial direction.

(g) In the flow rate control valve described in (f), the flow rate control valve is characterized in that the switching control valve is provided so as to overlap with the rotor in the rotation axial direction of the rotor.

In this way, by disposing the switching control valve so as to overlap with the rotor, there is a merit that the size of the flow rate control valve in the axial direction can be further effectively reduced.

(h) In the flow rate control valve described in (g), the flow rate control valve is characterized in that the switching control valve is provided adjacent to the second communication portion connecting to the radiator.

With this configuration, it becomes possible to further effectively dispose the switching control valve, and thereby further reducing the size of the flow rate control valve.

EXPLANATION OF SIGNS

10: introduction port (first communication portion)
E1 to E3: first to third discharge ports (a plurality of second communication portions)
CM: cooling control device
CV: flow rate control valve (first control valve)
SV: switching control valve (second control valve)

The invention claimed is:

1. A cooling control device that controls a cooling state of an external device by controlling a flow rate of a refrigerant that flows in from one of a first communication portion or a plurality of second communication portions and causing the refrigerant to flow out from the other of the plurality of the second communication portions or the first communication portion, comprising:
   a first control valve provided so as to connect the first communication portion with the plurality of the second communication portions and controlling the flow rate of the refrigerant between the first communication portion and the plurality of the second communication portions; and
   a second control valve disposed on a route different from that of the first control valve, provided so as to connect the first communication portion with a specific one of the plurality of the second communication portions, set so as to be able to supply a flow rate of the refrigerant required for cooling the external device when the first control valve is in an abnormal time, and controlling the flow rate of the refrigerant between both of the communication portions independently from the first control valve,
   wherein a maximum flow rate of the refrigerant which can be supplied by the first control valve is set lower than a flow rate of the refrigerant required when the external device is in a high load, and
   wherein the flow rate of the refrigerant which is supplied to the external device through the first communication portion and the specific one of the plurality of the second communication portions is controlled by cooperation of the first control valve and the second control valve.

2. The cooling control device according to claim 1, wherein the second control valve has:
   a temperature sensing part for detecting temperature of the refrigerant; and
   an opening and closing portion controlled by the temperature sensing part, and
   wherein a temperature at which the opening and closing portion opens is set higher than a valve opening temperature of the first control valve.

3. The cooling control device according to claim 2, wherein the temperature sensing part is formed of an extension member, and the extension member is connected to the opening and closing portion.

4. The cooling control device according to claim 3, wherein the extension member is wax.

5. The cooling control device according to claim 4, wherein the second control valve is integrally formed with the first control valve.

6. The cooling control device according to claim 4, wherein the second control valve is provided at the external device side.

7. The cooling control device according to claim 4, wherein the second control valve is provided in a casing that is provided between the external device and the first control valve.

8. The cooling control device according to claim 3, wherein the extension member is made of a shape memory alloy material.

9. The cooling control device according to claim 2, wherein the opening and closing portion opens and closes by an actuator that is driven and controlled based on the temperature detected by the temperature sensing part.

10. The cooling control device according to claim 9, where the actuator is an electromagnetic solenoid.

11. The cooling control device according to claim 1, wherein the cooling control device is a cooling control device for cooling an internal combustion engine through a radiator, and
   wherein the second control valve is disposed on a route that connects the first communication portion, to which the refrigerant that flows out from the internal combustion engine side flows in, with a second communication portion, which is connected to the radiator, of the plurality of the second communication portions.

12. The cooling control device according to claim 11, wherein the second control valve has:
   a temperature sensing part for detecting temperature of the refrigerant; and
   an opening and closing portion controlled by the temperature sensing part,
   wherein the temperature sensing part is disposed at an entrance side of the first communication portion, and
   wherein the opening and closing portion is disposed on a route that connects the specific second communication portion with the radiator.

13. A flow rate control valve which controls a flow rate of a refrigerant that flows in from one of a first communication portion or a plurality of second communication portions and causing the refrigerant to flow out from the other of the plurality of the second communication portions or the first communication portion according to a preset rule, comprising:
   a housing having a first communication port connected to the first communication portion and a plurality of second communication ports connected to the plurality of the second communication portions;

a valve body rotatably supported in the housing, and having a plurality of opening portions whose overlap states with the respective plurality of the second communication ports are changed according to a rotation position of the valve body;

an actuator controlling the rotation position of the valve body; and a switching control valve provided on a route that connects the first communication portion with a second communication portion, which is connected to a radiator, of the plurality of the second communication portions, set so as to supply a flow rate of the refrigerant at which temperature of the refrigerant decreases when the refrigerant is supplied to the radiator in an abnormal time of the flow rate control valve, and controlling a flow rate of the refrigerant in the route, wherein a maximum flow rate of the refrigerant which can be supplied to the radiator through the first communication portion and a specific one of the plurality of the second communication portions is set to a flow rate of the refrigerant at which the temperature of the refrigerant rises even if the refrigerant is supplied to the radiator, and wherein the flow rate of the refrigerant which flows on the route connecting the first communication portion with the second communication portion, which is connected to the radiator, is controlled by cooperation with the switching control valve.

14. The flow rate control valve according to claim 13, wherein the switching control valve is disposed in a rotation radial direction side of the valve body in the housing.

15. The flow rate control valve according to claim 14, wherein the switching control valve is provided so as to overlap with the valve body in a rotation axial direction of the valve body.

16. The flow rate control valve according to claim 15, wherein the switching control valve is provided adjacent to the second communication portion connecting to the radiator.

17. A cooling control method of a cooling control device that controls a cooling state of an external device by controlling a flow rate of a refrigerant that flows in from one of a first communication portion or a plurality of second communication portions and causing the refrigerant to flow out from the other of the plurality of the second communication portions or the first communication portion, the cooling control device having:

a first control valve provided so as to connect the first communication portion with the plurality of the second communication portions and controlling the flow rate of the refrigerant between the first communication portion and the plurality of the second communication portions; and a second control valve disposed on a route different from that of the first control valve, set so as to be able to supply a flow rate of the refrigerant required for cooling the external device when the first control valve is in an abnormal time, and controlling the flow rate of the refrigerant between both of the communication portions independently from the first control valve, wherein a maximum flow rate of the refrigerant which can be supplied by the first control valve is set lower than a flow rate of the refrigerant required for cooling the external device when the external device is in a high load, the cooling control method comprising:

controlling the flow rate of the refrigerant that is supplied to the external device through the first communication portion and the specific one of the plurality of the second communication portions by cooperation of the first control valve and the second control valve.

* * * * *